United States Patent [19]

Maeda et al.

[11] Patent Number: 6,118,650
[45] Date of Patent: Sep. 12, 2000

[54] MESOPHASE PITCH-BASED ACTIVATED CARBON FIBERS AND ELECTRIC DOUBLE LAYER CAPACITOR USING THE SAME

[75] Inventors: Takashi Maeda; Tetsuo Yamamoto; Yuji Kawabuchi; Tomiji Hosotsubo, all of Kamisu-machi, Japan

[73] Assignee: Petoca, Ltd., Tokyo, Japan

[21] Appl. No.: 09/054,073

[22] Filed: Apr. 6, 1998

[30] Foreign Application Priority Data

Dec. 4, 1997 [JP] Japan .................................. 9-348735

[51] Int. Cl.[7] .................................................. H01G 9/042
[52] U.S. Cl. ...................... 361/508; 429/231.8; 502/418
[58] Field of Search .................................. 502/416, 418, 502/429; 361/508; 429/231.4, 231.8

[56] References Cited

U.S. PATENT DOCUMENTS

| | | | |
|---|---|---|---|
| 3,817,874 | 6/1974 | Wennerberg et al. | 502/427 |
| 4,082,694 | 4/1978 | Wennerberg et al. | 502/427 |
| 4,946,663 | 8/1990 | Audley et al. | 423/447.1 |
| 5,143,889 | 9/1992 | Takahiro et al. | 502/427 |
| 5,401,472 | 3/1995 | Kawakami et al. | 422/151 |

FOREIGN PATENT DOCUMENTS

| | | |
|---|---|---|
| 0 312 395 | 4/1989 | European Pat. Off. . |
| 0 328 040 | 8/1989 | European Pat. Off. . |
| 513 332 | 2/1921 | France . |
| 41 18 342 | 12/1992 | Germany . |
| 1-139865 | 6/1989 | Japan . |

OTHER PUBLICATIONS

Abstracts of Japan, JP 5–247731, Sep. 24, 1993.

*Primary Examiner*—Steven P. Griffin
*Assistant Examiner*—Stuart Hendrickson
*Attorney, Agent, or Firm*—Oblon, Spivak, McClelland, Maier & Neustadt, P.C.

[57] ABSTRACT

Mesophase pitch-based activated carbon fibers which are obtained by milling infusibilized mesophase pitch fibers, as they are or after carbonizing at a temperature of 350 to 1,000° C., to an average particle diameter of 5 to 50 $\mu$m and then activating in the presence of an alkali metal compound. The activated carbon fibers have a pore distribution suitable for forming a electric double layer and is excellent as the material for an electrode of an electric double layer capacitor. The electric double layer capacitor having the electrode using the activated carbon fiber exhibits high discharge capacity.

3 Claims, 3 Drawing Sheets

MESOPHASE PITCH-BASED ACTIVATED CARBON FIBERS AND ELECTRIC DOUBLE LAYER CAPACITOR USING THE SAME

FIELD OF THE INVENTION

The present invention relates to novel activated carbon fibers which have a pore distribution suitable for forming electric double layer, and electric double layer capacitors using the electrodes comprising the novel activated carbon fibers, which have high discharge capacity.

BACKGROUND OF THE INVENTION

New electronic equipments such as portable telephones and notebook type personal computers have been recently developed one after another. With strong demands for miniaturization, weight-lightening and handy carrying of these merchandise, microcomputers, IC memories and other parts incorporated in the electronic equipments have been required to be miniaturized and to have high performance.

The elements for constituting high-performance miniaturized microcomputers, such as CPU, or the IC memories, however, undergo stall and memory erasure by the mere instantaneous discontinuance or decrease of power supply, whereby the electronic equipments occasionally misfunction. In fact, it is known that the electronic equipments misfunction by the mere voltage drop of 10 to 20% for 0.003 to 0.02 sec, unless proper measures are taken.

In order to prevent the discontinuance or decrease of power supply, Ni—Cd batteries or aluminum electrolytic capacitors are currently used for back-up power sources of the microcomputers and the IC memories. However, these power sources are not sufficient from the viewpoints of working temperature range, number of charge and discharge cycles, capacity, quick charge and discharge properties and cost.

In the circumstances, electric double layer capacitors have been recently paid much attention as the back-up power sources.

When two kinds of materials different in physical properties are contacted with each other, positive and negative electric charges are generally arrayed at short invervals with interposing the interface therebetween. The electric charge distribution formed on the interface is called an electric double layer. The electric double layer capacitor is a kind of a condenser to form an electric double layer of large capacity on the interface between an electrode having a large surface and an electrolytic solution and to release the electric charges of the electric double layer.

Studies of the electric double layers have history which can trace away back to the past, on the time of the study of Helmholtz in 1879. However, a long period of time was necessary for the practical use of the electric double layer capacitors, and a capacitor having large capacity of farad unit using this principle was obtained only in the early 1980's. In the present-day electric double layer capacitors, an organic solvent type electrolytic solution or an aqueous solution type electrolytic solution is used as the electrolytic solution, and granular, massive or fibrous activated carbon having large specific surface area is used as the electrode material, whereby large capacity is realized.

The electric double layer capacitors are not associated with such a chemical reaction as occurs in the conventional secondary batteries during the charge and discharge operations, so that their internal resistance is exceptionally low as compared with that of the secondary batteries, and besides large current discharge and quick charge and discharge are feasible. Moreover, the capacitors are free from deterioration caused by charge and discharge cycles and limitation on the number of charge and discharge cycles.

Because of these advantages, there have been proposed in recent years uses of the electric double layer capacitors not only in the fields concerned to small electric power such as a field of the aforesaid portable electronic equipments but also in the fields concerned to large capacity such as a field of auxiliary power sources of automobile batteries. For example, electric automobiles and gasoline-fueled automobiles, which are mounted with an electric double layer capacitor to charge a part of regenerative kinetic energy generated in the deceleration and to discharge the energy in the acceleration so as to supplement engine output energy, are manufactured by way of trial.

The most serious problem of the electric double layer capacitors is that the discharge capacity is smaller than that of the secondary batteries. To cope with this problem, various researches on the electrolytic solutions and the electrode materials have been made now.

For example, the activated carbons used as the electrode materials of the electric double layer capacitors are manufactured by the use of so called hard carbon (non-graphitizable carbon) materials, such as those made from coconut shell, coal and phenol resin, as starting materials. The non-graphitizable carbon materials are generally activated with water vapor or water vapor-containing exhaust gas generated by combustion of propane, kerosene, etc. to give activated carbons. In this activation treatment, pores are formed by a carbon elimination caused by the reaction of water vapor and/or carbon dioxide with carbons, and the pores define a density of fiber and a specific surface area of the activated carbons.

In general, the discharge capacity per unit weight of the electrode used for the electric double layer is proportional to the specific surface area of the activated carbon, and in the convention activation treatment, extremely severe conditions must be adopted to obtain activated carbon having a large specific area.

For example, to manufacture an electric double layer capacitor having large discharge capacity, an electrode formed from activated carbon having a specific surface area of not less than 2,000 $m^2/g$ (measured value by BET method) is desired to be used, and the activated carbon having such a large specific surface area as above should be prepared by activating a carbon material, e.g., hard carbon, under such severe activation conditions that the activation yield is reduced to about 10 to 20% by weight or lower.

More specifically, phenol resin-based activated carbon fibers obtained by activating phenol resin based carbon fibers in a combustion gas such as propane have a large specific surface area such as 2,500 $m^2/g$ and are commercially used for electric double layer capacitors, but the activation yield in this activation treatment is as extremely low as about 15% by weight.

The phenol resin-based activated carbon fibers exhibit excellent properties in water treatment or adsorption of harmful gas, but when they are used as electrode materials of electric double layer capacitors, they cannot raise electrode density because of low density of fiber, and hence the charge and discharge capacity per unit volume is not increased so much.

The phenol resin-based activated carbon fibers have another problem in that even if the specific surface area measured by BET method is enlarged, the discharge capacity per unit weight is not increased in proportion to the increase of specific surface area. It is presumably indicated by the phenomenon that not all of the surfaces of the activated carbon fibers obtained by the conventional activation method are utilized for the formation of the electric double layer. That is, it is presumed that, in order to form the electric double layer, activated carbon should have pores of optimum diameters for the electrolytic solution used, but the pores of the activated carbon formed by the conventional activation treatment are not optimum for the electric double layer capacitor.

As described above, the density of the conventional activated carbon is inevitably lowered by adoption of the severe activation conditions. Besides, pores having diameters suitable for the electrolyte solution cannot be sufficiently formed and, therefore, the surface area effective for the formation of an electric double layer is small. For these reasons, any activated carbon capable of realizing electrodes of electric double layer capacitors having sufficiently large discharge capacity per electrode unit volume and per electrode unit weight has not been developed in the existing circumstances.

For example, according to the measurement by the inventors, an electric double layer capacitor, which uses an electrode comprising phenol resin-based activated carbon fibers obtained by the conventional activation method and uses an organic solvent type electrolytic solution, has a discharge capacity of about 20 F/g which is markedly lower than that of the later-described examples of the invention.

In the conventional activation treatment wherein the non-graphitizable carbon material is activated with water vapor or exhaust gas, further, the material needs to be activated under severe conditions in order to obtain activated carbon having large specific area capable of improving the electrical capacity per unit weight, and such activation treatment causes increase of cost of the activated carbon.

The present inventors have earnestly studied to solve such problems associated with the prior art as described above and has found as a result that activated carbon fibers having excellent conductivity, high density, large surface area and, when applied for an electrode of an electric double layer, capable of realizing high discharge capacity can be obtained by activating a soft carbon (easily graphitizable carbon) type material, particularly an infusibilized mesophase pitch-based carbon fibers, after a specific treatment.

The inventors have further found from the observation and comparison of many kinds of mesophase pitch-based activated carbon fibers and non-mesophase pitch-based activated carbon fibers obtained by the exhaust gas activation having various BET specific surface areas that the high discharge capacity is dependent not only on the specific surface area, but also on the distribution state (by volume) of pores having specific radii in the activated carbon fibers.

Based on the finding, the present invention has been accomplished.

As other activation treatment methods than the above-mentioned ones using water vapor or exhaust gas, heat treatment methods using alkali metal compounds are disclosed in U.S. Pat. No. 3,817,874 and No. 4,082,694.

However, any trial for using mesophase pitch-based active carbon fibers as materials for electrodes of electric double layer capacitors had not been made at all.

Japanese Laid-Open Publication No. 1(1989)-139865 discloses a process comprising activating carbon fibers in the presence of an alkali metal compound and Japanese Laid-Open Publication No. 5(1993)-247731 discloses a process for producing carbon fibers having high specific surface area, in which the above technique is applied to a carbon fibers of mesophase of not less than 50%.

However, these documents never disclose or suggest the use of the activated carbon fibers for the double layer capacitor, a process for preparing, from graphitizable carbon material, activated carbon fibers having a pore distribution suitable for forming an electric double layer, and the pore distribution.

OBJECT OF THE INVENTION

It is an object of the present invention to provide novel activated carbon fibers having good conductivity, high balk density and large specific area, and having a pore distribution suitable for forming an electric double layer.

It is another object of the invention to provide an electric double layer capacitor which comprises an electrode comprising the novel activated carbon fibers.

SUMMARY OF THE INVENTION

The mesophase pitch-based activated carbon fibers according to the present invention are obtained by milling infusibilized mesophase pitch fibers as they are, or after carbonizing at a temperature of 350 to 1,000° C., to an average particle diameter of 5 to 50 $\mu$m and activating them in the presence of an alkali metal compound.

The mesophase pitch-based activated carbon fibers of the invention desirably have 0.01 to 0.25 of a ratio Bv/Av in which Av is a total pore volume of pores (A) having a radius of 0.4 to 1.5 nm, said pore volume Av being measured by a MP method using nitrogen adsorption, and Bv is a total pore volume of pores (B) having a radius of 3.5 to 6 nm, said pore volume Bv being measured by a mercury porosimeter, and further desirably have a specific surface area measured by BET method of not less than 300 m$^2$/g. The mesophase pitch-based activated carbon fibers are especially suitable for an electrode of the electric double layer capacitor.

The mesophase pitch-based activated carbon fibers of the present invention are desirably made from mesophase pitch in which an optically anisotropic component is 100%.

The electric double layer capacitor according to the present invention is made by using the mesophase pitch-based activated carbon fibers and may comprise an electrode comprising the mesophase pitch-based activated carbon fibers and a binder.

DETAILED DESCRIPTION OF THE INVENTION

Figure 1:
FIG. 1 is a 500-magnification SEM (scanning electron microscopy) photograph of milled mesophase pitch-based activated carbon fibers prepared in Example 1.

The mesophase pitch-based activated carbon fibers according to the invention and the electric double layer capacitor made by using the novel activated carbon fibers are described in detail hereinafter.

The mesophase pitch-based activated carbon fibers according to the invention are obtained by activating infusibilized mesophase pitch fibers as they are or after subjecting them to a specific treatment(s).

The mesophase pitch fibers are materials belonging to soft carbons (easily graphitizable carbons). In the fibers of this type, pores effective for an electric double layer capacitor are not sufficiently formed by the aforesaid conventional activation method.

In the conventional activation method, hard carbon (non-graphitizable carbon) materials such as coconut shell, coal, phenol resin are used as starting materials, and pores are formed by carbon elimination caused by the reaction of water vapor and/or carbon dioxide with carbon in the activation treatment. As for the hard carbons, it is presumed that many elements such as oxygen and hydrogen are eliminated in the course of heat treatment, and therefore active sites attacked by water vapor or carbon dioxide are innumerably present, whereby the pores are formed.

On the other hand, the soft carbons for use in the invention have higher crystallizability and have few active attack sites, so that if the conventional activation treatment is performed, reaction to produce water gas takes place on only the surface of the material and pores are insufficiently formed as compared with the hard carbons. Therefore, activated carbon having large specific surface area is hardly obtained for the decrease of the activation yield. For example, in the activated carbon fibers made by subjecting the mesophase pitch fibers to the conventional activation treatment, the obtained specific surface area is as low as about less than 300 $m^2/g$, which is insufficient as that of the material for the electric double layer capacitor.

The mesophase pitch-based activated carbon fibers according to the invention are obtained by using infusibilized mesophase pitch fibers which are activated as they are or after subjecting to a specific treatments and, therefore, have a large BET specific surface area (not less than 300 $m^2/g$).

The infusibilized mesophase pitch fibers for use in the process of the invention are prepared by spinning pitch as a starting material to obtain pitch fibers and then infusibilizing the pitch fibers.

There is no specific limitation on the material of the pitch fibers as far as it is spinnable mesophase pitch and any of petroleum-derived pitch, coal-derived mesophase pitch and mixed pitch containing isotropic pitch is available. However, since the mixed pitch has an uneven pitch structure, the activation reaction of the pitch becomes uneven to thereby make the control of the pore structure difficult, and the spinnability and infusibilizing properties of the pitch become worse. Therefore, it is especially preferred to use a mesophase pitch of 100% anisotropic component, which contains no optically isotropic component detected by observation with a polarized microscope.

The mesophase pitch as the material of the pitch fibers having a suitable softening point, e.g., 230 to 350° C., preferably 250 to 310° C., is advantageously used from the viewpoints of manufacturing cost and manufacturing stability.

There is no specific limitation on the method of spinning the pitch material, and the pitch material can be spun by various spinning methods such as a melt spinning method, a melt blow method, a centrifugal spinning method and a vortex spinning method. Of these, the melt blow method is preferable.

According to the melt blow method, the pitch material is spun while being blow and cut at a high speed because of its low viscosity of not more than several tens poise, while being cooled at a high speed. Therefore, the melt blow method is high in productivity of the pitch fibers, advantageous in the manufacturing cost such as expenses for building and operating a spinning machine, and is particularly suitable for preparing carbon fiber aggregates such as carbon fiber mat and carbon fiber felt.

In the melt blow method, the spinning hole is desired to have a diameter of usually 0.1 to 0.5 mm, preferably 0.15 to 0.3 mm.

The spinning rate is desired to be not less than 500 m/min, preferably not less than 1,500 m/min, more preferably not less than 2,000 m/min.

The spinning temperature somewhat varies depending on the type of the pitch material, but desirably is in the range of 300 to 400° C., preferably 300 to 380° C.

The mesophase pitch is a thermoplastic organic compound. Therefore, in order to make the mesophase pitch fibers retain their shapes in the heat treatment (carbonization treatment or activation treatment), the mesophase pitch fibers obtained above are subjected to infusibilization.

The infusibilization treatment can be continuously carried out in a liquid phase or in a gas phase in accordance with a conventional method, but it is generally carried out in an oxidizing atmosphere such as air, oxygen or $NO_2$.

For example, the infusibilization treatment in air is desirably carried out under the conditions of an average heating rate of 1 to 15° C. /min, preferably 3 to 12° C. /min, and a temperature of 100 to 350° C., preferably about 150 to 300° C.

If the pitch fibers are directly subjected to slight carbonization treatment or activation treatment without performing infusibilization treatment, the pitch fibers are fused again in the next heating process to disarrange the orientation of the graphite layer surface, and in an extreme case, the shapes of the fibers are destroyed. As a result, activated carbon fibers having desired large specific surface area cannot be obtained.

For preparing the mesophase pitch-based activated carbon fibers of the invention, the infusibilized pitch fibers obtained above can be used as they are in the activation treatment, but it is desirable to perform carbonization treatment, preferably slight carbonization treatment at a relatively low temperature (up to 1,000° C.), prior to the activation treatment.

By the carbonization treatment, low volatile components contained in the infusibilized fibers can be removed, and hence the activation yield in the activation process can be improved. Besides, the amounts of tar-like substances which volatilize in the activation reaction can be reduced, and whereby stain of the reaction system can be effectively prevented.

The carbonization treatment can be carried out in an inert gas such as nitrogen at a temperature of 350 to 1,000° C., preferably 350 to 800° C., more preferably 400 to 700° C.

If the temperature of the slight carbonization treatment exceeds 1,000° C., the activation rate becomes low and the activation reaction occasionally needs a long period of time. The lower limit of the heating temperature in the carbonization treatment is not specifically limited as far as the carbonization is smoothly performed, but if the temperature is lower than 350° C., removal of the volatile components might be insufficient.

In the process for preparing mesophase pitch-based activated carbon fibers according to the invention, the infusibilized pitch fibers or the carbon fibers retain the form obtained in the spinning stage, e.g., mat form or felt form, and they can be used as they are. However, the infusibilized pitch fibers or the carbon fibers obtained in the form of, for example, mat or felt are milled prior to the activation treatment from the viewpoint of uniform mixing with an alkali metal compound used as an activation assisting agent in the activation treatment, improvement in balk density of fibers, and formation of the suitable pore distribution.

For milling the fibers, a Henschel mixer, a ball mill and a grinder are employable, but if these devices are used, a pressure is applied in the diameter direction of the fibers, whereby longitudinal cracks often take place in the fiber axis direction. In addition, a long period of time is necessary for the milling. Therefore, these devices are not appropriate milling devices.

Examples of the milling devices preferably used include a victory mill, a jet mill, a cross flow mill and high-speed rotary mill. In these devices, a rotor equipped with one or more blades is rotated at a high speed to cut the fibers into pieces, and hence occurrence of the longitudinal cracks can be effectively inhibited. The fiber length can be controlled by adjusting a rotating number of the rotor, an angle of the blade, etc.

In the present invention, the infusibilized, milled fibers or the carbonized, milled fibers obtained as above have a mean particle diameter, as measured by a laser diffraction method, of 5 to 50 $\mu$m, particularly preferably 10 to 30 $\mu$m.

If the mean particle diameter exceeds 50 $\mu$m, the density of fiber may not be sufficiently improved. If the mean particle diameter is less than 5 $\mu$m, uniform activation can be hardly obtained.

In the activation treatment in the process for producing the activated carbon fibers of the invention, the milled infusibilized pitch fibers or the milled carbon fibers are mixed with an alkali metal compound and subjected to heat treatment.

Examples of the alkali metal compounds preferably used for the activation treatment in the process of the invention include potassium hydroxide, potassium carbonate, potassium nitrite, potassium sulfate, potassium chloride and potassium permanganate. Of these, potassium hydroxide is most preferable.

The alkali metal compound is used in an amount of 0.5 to 5 times, preferably 1 to 4 times, more preferably 1.5 to 3 times the weight of the infusibilized pitch fibers or the carbon fibers.

If the amount of the alkali metal compound is less than 0.5 time, formation of pores cannot be made efficiently. Contrariwise, even if the alkali metal compound is added in an amount of more than 5 times, the specific surface area of the obtained carbon fibers is not increased so much, resulting in bad efficiency.

The activation treatment is carried out by heating a uniform mixture of the alkali metal compound and the infusibilized pitch fibers or the carbon fibers at a temperature of 500 to 900° C., preferably 600 to 800° C., in an inert gas such as nitrogen.

If the activation temperature is lower than 500° C., the reaction hardly proceeds. If the activation temperature exceeds 900° C., precipitation of alkali metal or corrosion of the apparatus occasionally takes place.

It is desired that the reaction product obtained by the activation treatment is cooled to room temperature and then subjected to removal of the unreacted alkali metal compound, for example, by means of washing with water.

According to the above-described process for preparing mesophase pitch-based activated carbon fibers, mesophase pitch-based activated carbon fibers having a large BET specific surface area, specifically not less than 300 m²/g, preferably 500 to 2,800 m²/g, more preferably 600 to 2,500 m²/g.

The BET specific surface area of the mesophase pitch-based activated carbon fibers of the invention is preferably as large as possible, from the point of view that the surface for forming an electric double layer can be widened. If the BET specific surface area of the mesophase pitch-based activated carbon fibers is less than 300 m²/g, an electric double layer capacitor having satisfactory discharge capacity per unit weight may not be obtained. The upper limit of the BET specific surface area of the mesophase pitch-based activated carbon fibers according to the invention is not specifically limited, however, even if the BET specific surface area exceeds 2,000 m²/g, it is likely that the capacity of the capacitor is not so increased and the activation needs a long period of time, occasionally resulting in decrease of activation yield. Therefore, the upper limit of the BET specific surface area is about 2,800 m²/g.

In this connection, pores of on activated carbon are classified into the groups of: macropores having a pore diameter of not less than 50 nm; mesopores having a pore diameter of not less than 2 nm to less than 50 nm; micropores having a pore diameter of not less than 0.8 nm to less than 2 nm; and submicropores having a pore diameter of less than 0.8 nm. These pores are opened on the surface of the activated carbon fiber and elongated into the inside thereof.

In the mesophase pitch-based activated carbon fibers of the present invention, it is preferable that specific two kinds of pores belonging to the range of from the mesopores to the submicropores are present at a specific volume ratio.

That is, in the mesophase pitch-based activated carbon fibers of the present invention, a ratio Bv/Av, in which Av is a total pore volume of pores (A) having a radius of 0.4 to 1.5 nm, said pore volume Av being measured by MP method using nitrogen adsorption, and Bv is a total pore volume of pores (B) having a radius of 3.5 to 6 nm, said pore volume Bv being measured by a mercury porosimeter, is 0.01 to 0.25, preferably 0.05 to 0.20, especially 0.10 to 0.18.

In the mesophase pitch-based carbon fiber, when the Bv/Av ratio is less than 0.01, it is likely that the charge capacity is not increased for its specific surface area and, when the Bv/Av ratio is not less than 0.25, it is likely that the charge capacity is not increased for its specific area as well and the activation yield of the activated carbon fibers is decreased.

The reason for the existence of the suitable Bv/Av ratio is considered as follows.

That is, the pores (A) having a radius of 0.4–1.5 nm greatly contribute to enlargement of an area at which an electric double layer is formed, to thereby increase the charge capacity. Therefore, it is expected that when the existence ratio of the pores (A) (volume ratio) is increased, high charge capacity can be realized. However, since the radius of the pores (A) is too small to allow the electrolyte or the electrolytic solution penetrating into the inside of the pores, namely the inside of the activated carbon fiber by passing through the pores, the increase in the volume of only the pores (A) does not make the charge capacity increased. While, the pores (B) having a radius of 3.5 to 6 nm is elongated from the surface to inside of the activated carbon fiber and have a sufficient radius to allow the electrolyte or the electrolytic solution passing therethrough. Therefore, they can make the electrolyte or the electrolytic solution reach the pores (A) present in the inside of the activated carbon fiber. However, since the contribution of the pores (B) to enlargement of an area at which an electric double layer formed is not so great, the increase in the volume of only the pores (B) does not make the charge capacity increased to the level of expectation.

The total volumes (Av), (Bv) of the pores (A) and (B) in the mesophase pitch-based activated carbon fiber of the invention are the value obtained by analyzing by MP method measurements of pores having a radius of up to 2 nm (namely, pores (A)) in the BET method using nitrogen adsorption and the value obtained by measuring pores having a radius of not less than 3.5 nm (namely, pores (B)) with a mercury porosimeter, respectively.

The measuring method using a mercury porosimeter is generally used in the measurements of the macropores having a radius of not less than 3.5 nm. Concretely, the measuring method comprises the steps of: introducing mercury into a cell containing a sample in vacuo; applying a pressure to the sample to thereby allow the mercury injected into the pores; varying the pressure; and measuring the volumes of the injected mercury (pore volume) at each pressure. The total volume of the pores (B) can be calculated from the resultant data by using the following equation (1) which shows the relationship between the pressure and the radius of a pore on the supposition that the pore is a cylindrical, and the following equation (2) which shows the relationship between a volume percentage of pores within a minute radius range and the total volume of all pores.

$$\gamma = -2\sigma \cos \theta / P \times 10^{-6} \quad (1)$$

γ: radius of pore (nm)
σ: surface tension of mercury (dyn/cm)
θ: contact angle of mercury to the sample (°)
P: mercury injecting pressure (N/m²)

$$\phi = (dV/V) \times 100 \quad (2)$$

φ: volume percentage of pores (%)
V: total volume of all pores within all radius ranges (ml/g)
dV: total volume of pores within a minute radius range dV (ml/g)

The MP method is mainly used for the analysis of micropores and, in the method, the total volume of the pores (A) is calculated by t-plotting the data obtained by the BET measurement using nitrogen and analyzing the curvature adjacent to a bending portion.

The electric double layer capacitor of the present invention may comprises a electrode comprising the mesophase pitch-based activated carbon fibers and a binder.

The binder can be a known binder which is conventionally used for preparing an electrode using activated carbon, and is, for example, polyethylene, polytetrafluoroethylene (PTFR) or polyvinylidene chloride (PVDF).

The electrode used in the invention can be manufactured in accordance with a conventional process for manufacturing activated carbon electrodes. For example, the mesophase pitch-based activated carbon fibers and the binder are subjected to pressure roll molding to give a sheet electrode or a plate electrode. In this case, it is effective to add a graphite powder or acetylene black as a conductive material.

The electrode may be combined with a foil, a plate or a mesh of a metal such as nickel, which serves as a current collector.

The electrode used in the invention can be improved in the current collecting property by depositing a conductive material such as aluminum on the mesophase pitch-based activated carbon fibers. It is also possible that the mesophase pitch-based activated carbon fibers deposited with the conductive material is altered into a paper-like form to give a paper electrode.

The electrode manufactured as above is desired to have a density of usually 0.5 to 1.2 cm³/g, preferably 0.7 to 1.0 cm³/g, from the viewpoint of increase of the discharge capacity per unit volume.

The electric double layer capacitor according to the invention can be made by the combination use of the electrode obtained as above and an electrolytic solution.

The electrolytic solution employable for the electric double layer capacitor of the invention is an organic solvent type electrolytic solution obtained by dissolving an electrolyte in an organic polar solvent or an aqueous solution type electrolytic solution obtained by dissolving an electrolyte in water.

Examples of the aqueous solution type electrolytic solutions include aqueous solutions of NaCl, NaOH, KOH, HCl and $H_2SO_4$. Particularly preferable is a sulfuric acid aqueous solution because it is easily obtainable and is excellent in capacity of the capacitor.

Examples of the organic solvents for use in the organic solvent type electrolytic solution include propylene carbonate, γ-butyrolactone, dimethyl sulfoxide, dimethylformamide, acetonitrile, ethylene carbonate, tetrahydrofuran and dimethoxyethane.

These organic solvents may be used singly or may be used as mixed solvents of two or more kinds. These solvents have high affinity for water and generally have high solubility in water, so that they can be used after mixed with water in an optional mixing ratio.

Examples of the electrolytes for use in the organic solvent type electrolytic solution include salts of cations and anions. Particular examples of the cations include metallic cations, quaternary ammonium cation and carbonium cation. Particular examples of the anions include $ClO_4^-$, $BF_4^-$, $PF_4^-$, $PF_6^-$ and $AsF_6^-$.

Preferable electrolytes are, for example, $LiClO_4$, $BuN \cdot ClO_4$ and $TEABF_4$.

The electrolyte is desirably used in a concentration of 0.5 to 3 M/L, preferably 1 to 2 M/L.

When the aqueous solution type electrolytic solution is used, the capacity of the resulting electric double layer capacitor can be increased to about 1.3 to 2 times as much as that of the capacitor using the organic solvent type electrolytic solution, and the internal resistance can be decreased to about ⅕ to ¹/₁₀ as much as that of the capacitor using the organic solvent type electrolytic solution.

The decrease of the internal resistance of the capacitor using the aqueous solution type electrolytic solution is caused by a low internal resistance of the aqueous solution type electrolytic solution. In case of using the aqueous solution type electrolytic solution, however, the voltage during the charge operation can be increased to barely about 1 V, and therefore the charge capacity per unit volume tends to be decreased.

On the other hand, when the organic solvent type electrolytic solution is used, the voltage of the electric double layer capacitor can be increased to at most about 3 V, and thereby the discharge capacity per unit volume of the electric double layer capacitor (defined by the formula ½CV², C: capacity of capacitor, V: voltage) can be increased. Therefore, the organic solvent type electrolytic solution is preferable from the viewpoint of large current discharge.

There is no specific limitation on the structure of the electric double layer capacitor of the invention or the process for preparing the same, as far as the above-described electrode and electrolytic solution are used for the preparation.

For example, the electric double layer capacitor of the invention can be prepared by the following process. A pair of electrodes, each of which is obtained by cutting the above-described electrode into the desired size and shape, and a conventional separator are encased in a casing in such a manner that the separator is arranged between the electrodes. Then, the electrolytic solution is poured into the casing, and the container is closed by caulking with a closure plate and a gasket.

EFFECT OF THE INVENTION

Because the mesophase pitch-based activated carbon fibers according to the invention are obtained by activating infusibilized mesophase pitch fibers as they are or after subjecting to the specific treatment, they have low internal resistance, good conductivity, high density of fiber and large specific surface area and have a suitable pore distribution effective for the formation of an electric double layer.

The electric double layer capacitor of the invention is made by using the above mesophase pitch-based activated carbon fibers, has large charge and discharge capacity per unit volume and per unit weight, and is capable of performing large current discharge. Therefore, the capacitor can be advantageously applied to not only uses for small current discharge, such as back-up power sources of IC memories or microcomputers of portable small-sized electronic equipments, but also uses for large current discharge, such as power sources of auxiliary driving gears for electric automobiles and gasoline-fueled automobiles.

EXAMPLE

The present invention is further described with reference to the following examples, but it should be construed that the invention is in no way limited to those examples.

In the following examples, the specific surface area is measured by a BET method and is expressed by a number obtained by rounding the number of units to the number of tens in consideration of accuracy of measurement.

The discharge capacity of the electric double layer capacitors prepared in the examples was measured according to the following methods.

Measurement of Discharge Capacity

The discharge capacity of the electric double layer capacitor was determined by a constant-current discharge method. That is, the capacitor was discharged at a constant current to obtain a discharge curve. This discharge curve was regarded as an almost straight line, and using the straight line, a direct-current electrostatic capacity was calculated from the rate of change in the capacitor voltage with time. The discharge capacity (F/g) per unit weight of the activated carbon fibers was determined based on the total weight of the activated carbon fibers in both of the positive and negative electrodes.

Example 1

Preparation of Mesophase Pitch-based Activated Carbon Fibers

Optically anisotropic pitch (Metller softening point: 285° C., mesophase component content: 100%) obtained by heat treating a cracking residue of petroleum was subjected to melt blow spinning using a nozzle having 1,000 spinning holes (diameter: 0.2 mm) linearly arranged in a slit having a width of 2 mm, to prepare pitch fibers. The pitch fibers were sucked from the back side of a stainless steel mesh belt (35-mesh) to collect the fibers on the belt, whereby a pitch fiber mat was obtained.

The pitch fiber mat was heated in the air at an average heating rate of 4° C. /min from a room temperature to 300° C. to perform infusibilization.

The infusibilized pitch fiber mat thus obtained was subjected to a carbonization treatment at 700° C. in a nitrogen gas. The resulting carbon fiber mat was milled by a high-speed rotary mill to obtain milled carbon fibers having a mean particle diameter of 25 $\mu$m.

To the milled mesophase pitch-based carbon fibers, potassium hydroxide was added in an amount of two or four times the weight of the fibers, and they were uniformly mixed. The resulting mixtures were heated and activated at 700° C. for 7 hours in a nitrogen gas to obtain three kinds of the milled activated carbon fibers 1 to 3.

The milled activated carbon fibers 1 to 3 obtained were cooled to ordinary temperature, then introduced into isopropyl alcohol and washed with water until they were neutral.

The activation yields, BET specific surface areas and pore volume ratios (Bv/Av) of the mesophase pitch-based activated carbon fibers 1 to 3 were measured. The results are shown in Table 1 together with the production conditions.

As shown in Table 1, the activation yields of the milled activated carbon fibers 1 to 3 were as high as 88% by weight, 77% by weight and 74% by weight, respectively. Moreover, each of the milled activated carbon fibers 1 to 3 has a BET specific surface area of 1,020 $m^2$/g, 2,070 $m^2$/g or 2,490 $m^2$/g and a ratio Bv/Av of 0.06, 0.08 or 0.22.

SEM photograph of the mesophase pitch-based activated carbon fibers 3 is shown in FIG. 1 of the attached drawings.

Preparation of Electrode Sheet

To each of the milled activated carbon fibers 1 to 3 thus obtained, 10% by weight of acetylene black as a conducting assisting agent and 7% by weight of PTFE as a binder were added. The resulting mixtures were rolled and contact bonded to nickel meshes, respectively, to form three kinds of electrode sheets.

Preparation of Electric Double Layer Capacitor

Figure 2A:
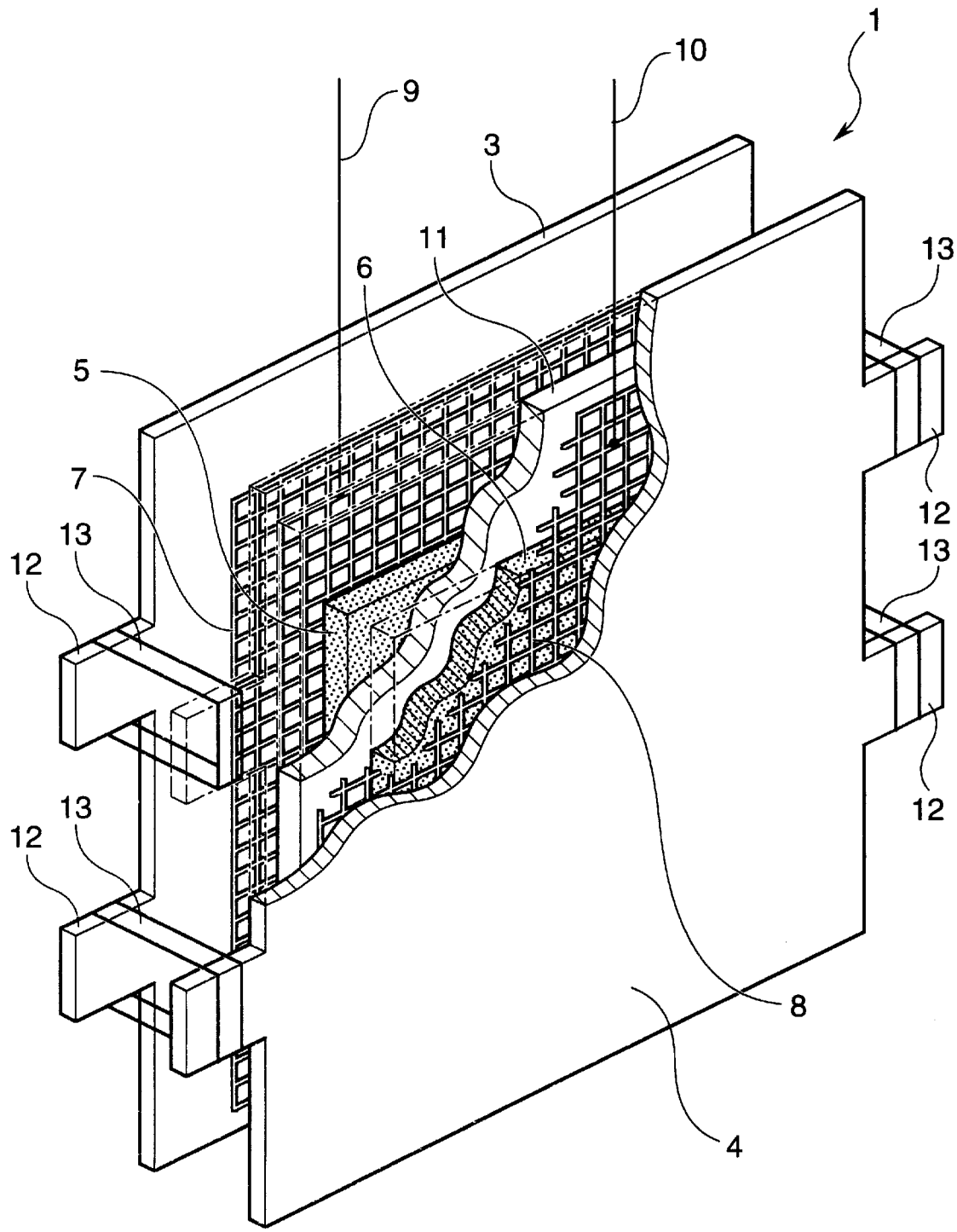
FIG. 2A is a schematic perspective view showing a basic structure of an electric double layer capacitor prepared in Example 1.
Figure 2B:
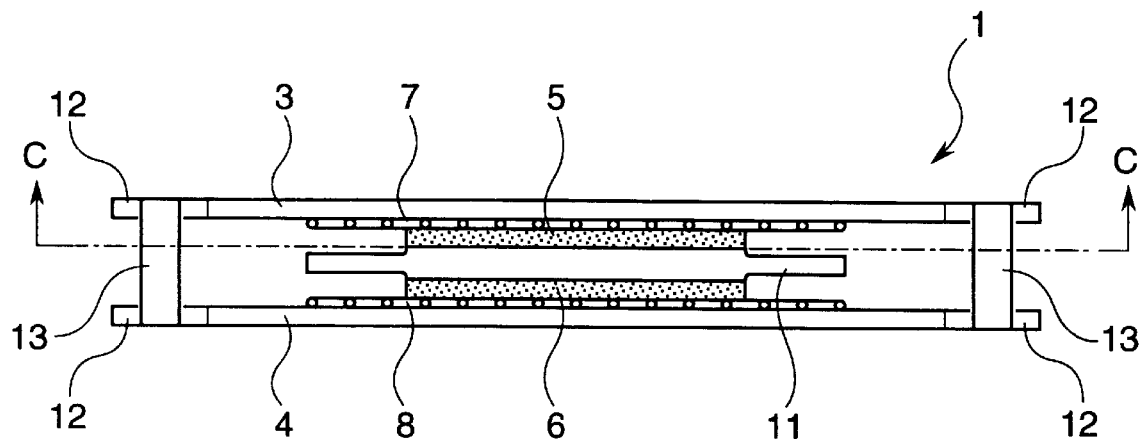
FIG. 2B is a plan view of the capacitor.
Figure 2C:
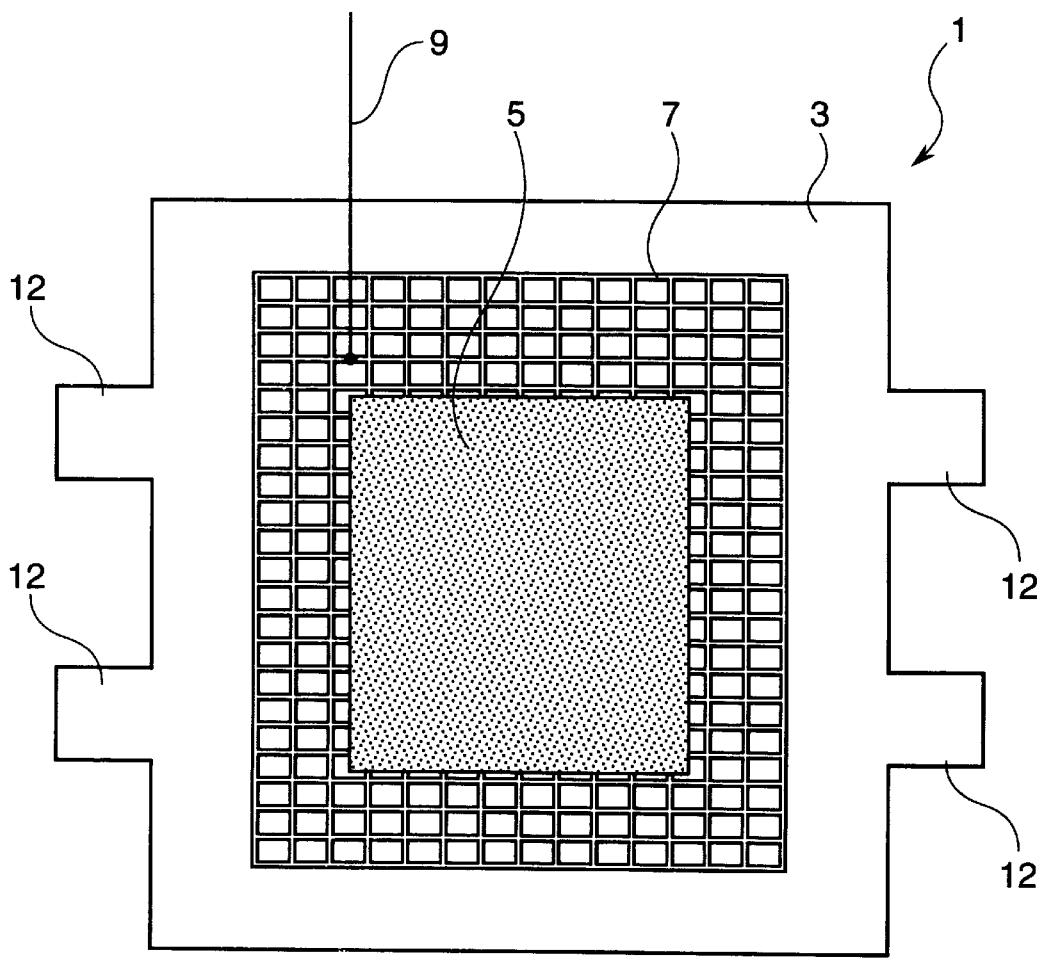
FIG. 2C is a sectional view taken in line C—C of FIG. 2B.

To examine performance of each of the electrode sheets, an electric double layer capacitor shown in FIGS. 2A to 2C of the attached drawings was prepared. As shown in FIGS. 2A to 2C, the electric double layer capacitor 1 has two pressurizing plates 3, 4 and a pair of electrode sheets 5, 6 arranged between the pressurizing plates 3, 4.

The electrodes 5, 6 includes the nickel meshes 7, 8 on the pressurizing plate sides, and to the nickel meshes are welded ends of nickel wires 9, 10. Between the electrode sheets 5, 6, a separator (filter paper) 11 is arranged.

Each of the pressurizing plates 3, 4 has four fixation protrusions 12, 12—outwardly protruded from edges of both sides of the plate. The electrode sheets and the separator are fixed between the pressurizing plates by winding Tetron bands 13, 13—around the protrusions 12, 12—, and they are immersed in an electrolytic solution.

The electrolytic solution of the electric double layer capacitor 1 was prepared by dissolving 1 M of lithium perchlorate as an electrolyte in propylene carbonate.

The electric double layer capacitor was charged at a voltage of 2.0 V through the wires 9, 10 and then discharged. As a result, excellent discharge capacities of 30 F/g, 42 F/g and 45 F/g were obtained.

Comparative Example 1

A carbon fiber mat was obtained in the same manner as in Example 1, except that an optically isotropic pitch (Metller softening point: 270° C.) was used as a starting material and carbonization temperature was changed to 950° C.

The resulting carbon fiber mat was activated at 900° C. in an atmosphere containing 40% carbon dioxide with varying the treating period to 2, 6 or 8 hours to obtain three kinds of activated carbon fibers 4 to 6. The activation yields, BET specific surface areas and pore volume ratio (Bv/Av) of the activated carbon fibers 4 to 6 were measured, and are shown in Table 1 together with the reaction conditions.

As shown in Table 1, the activation yields of the activated carbon fibers 4 to 6 ranged as low as 9 to 52% by weight, and these activated carbon fibers 4 to 6 had a BET specific surface area of 1,010 to 2,500 $m^2/g$ and a ratio Bv/Av of 0.

After milling the activated carbon fibers 4 to 6, three kinds of electrode sheets and electric double layer capacitors were prepared using the milled activated carbon fibers 4 to 6 having an average particle diameter of 25 μm in the same manner as in Example 1. A discharge capacity of each of the electric double layer capacitors was measured in the same manner as in Example 1. As a result, the discharge capacities ranged as low as 15 to 32 F/g.

were measured, and are shown in Table 2 together with the reaction conditions.

As shown in Table 2, the activation yield of the activated carbon fibers 7 was 90% by weight, and the fibers had a BET specific surface area of 890 $m^2/g$ and a ratio Bv/Av 0.03.

Using the milled activated carbon fibers 7, an electrode sheet and an electric double layer capacitor were prepared in the same manner as in Example 1. A discharge capacity of the electric double layer capacitor was measured in the same manner as in Example 1. As a result, the discharge capacity was 34 F/g.

Example 3

A milled infusibilized pitch fibers having an average particle diameter of 25 μm were obtained by milling with a high-speed rotary mill a infusibilized pitch fiber mat obtained in the same manner as in Example 1.

The milled infusibilized pitch fibers were mixed with potassium carbonate in an amount of 4 times the weight of the fibers. The resulting mixture was heated at 700° C. for 2 hours in a nitrogen gas to perform activation, and then washed in the same manner as in Example 1 to obtain milled mesophase pitch-based activated carbon fibers 8.

The activation yield, BET specific surface area and pore volume ratio (Bv/Av) of the milled activated carbon fibers

TABLE 1

|  | Example 1 | | | Comparative Example 1 | | |
| --- | --- | --- | --- | --- | --- | --- |
|  | (1) MACF 1 | MACF 2 | MACF 3 | MACF 4 | MACF 5 | MACF 6 |
| Pitch Material | 100% optically anisotropic pitch | | | optically isotropic pitch | | |
| Temperature (° C.) | 700 | | | 950 | | |
| Milling (2) | after carbonization | | | after activation | | |
| Activation Method | activation using KOH | | | activation using carbon dioxide (40%) | | |
| Amount of KOH (relative to CF) | 2 | 4 | 4 | — | | |
| Activation Temperature (° C.) | 700 | 700 | 700 | 950 | | |
| Activation Time (hr) | 2 | 2 | 4 | 2 | 6 | 8 |
| Activation Yield (wt %) | 88 | 77 | 74 | 52 | 24 | 19 |
| Specific Surface Area (m2/g) | 1,020 | 2,070 | 2,490 | 1,010 | 2,050 | 2,500 |
| Pore Volume Av (3) (ml/g) | 0.56 | 0.96 | 1.22 | 0.35 | 0.89 | 1.15 |
| Pore Volume Bv (4) (ml/g) | 0.031 | 0.073 | 0.268 | 0.00 | 0.00 | 0.00 |
| (Bv)/(AV) | 0.06 | 0.08 | 0.22 | 0 | 0 | 0 |
| Capacity of Capacitor (F/g) | 30 | 42 | 45 | 15 | 24 | 32 |

(note)
(1) MACF: Milled activated carbon fibers
(2) Milling: High-speed rotary mill
(3) Pore volume Av: A total pore volume of pores (A) of a radius of 0.4 to 1.5 nm and calculated by the MP method from the results of the BET measurement using nitrogen adsorption.
(4) Pore volume Bv: A total pore volume of pores (B) of a radius of 3.5 to 6 nm and measured with a mercury porosimeter.

Example 2

Milled carbon fibers having an average particle diameter of 25 μm were obtained in the same manner as in Example 1, except that the carbonization temperature was varied to 950° C.

The milled carbon fibers were mixed with potassium hydroxide in an amount of 4 times the weight of the fibers. The resulting mixture was heated at 800° C. for 4 hour in a nitrogen gas to perform activation, and then washed in the same manner as in Example 1 to obtain milled mesophase pitch-based activated carbon fibers 7.

The activation yield, BET specific surface area and pore volume ratio (Bv/Av) of the milled activated carbon fibers 7 were measured, and are shown in Table 2 together with the production conditions.

As shown in Table 2, the activation yield of the milled activated carbon fibers 8 was 70% by weight, and the activated carbon fibers had a BET specific surface area of 2,150 $m^2/g$ and a ratio Bv/Av of 0.16.

Using the milled activated carbon fibers 8, an electrode sheet and an electric double layer capacitor were prepared in the same manner as in Example 1. A discharge capacity of the electric double layer capacitor was measured in the same manner as in Example 1. As a result, the discharge capacity was 40 F/g.

Comparative Example 2

Mesophase pitch-based carbon fiber mat obtained in the same manner as in Example 1 was directly subjected to activation treatment in the same manner as in Example 1 to produce an activated carbon fiber mat.

The activated carbon fibers mat was washed in the same manner as in Example 1. The washed activated carbon fiber mat was milled by a high-speed rotary mill to obtain milled activated carbon fibers 9 having an average particle diameter of 25 μm.

The activation yield and BET specific area of the activated carbon fiber mat after washing, and the pore volume ratio (Bv/Av) of the milled activated carbon fibers 9 were measured, and are shown in Table 2 together with the production conditions.

The activation yields and BET specific surface area of the activated carbon fiber mat were 88% by weight and 1,610 m²/g, respectively. However, in the milled activated carbon fibers 9, the pores having a radius of 3.5 to 6 nm were not detected and a ratio Bv/Av was 0. The result may be caused by the milling treatment conducted after the activation treatment.

Using the activated carbon fibers 9, electrode sheets and electric double layer capacitors were prepared in the same manner as in Example 1. Discharge capacities of the electric double layer capacitors were measured in the same manner as in Example 1. As a result, low value of 25 F/g was obtained.

Reference Example 1

Milled mesophase pitch-based carbon fibers having an average particle diameter of 25 μm were prepared in the same manner as in Example 1, except that the carbonization temperature was varied to 600° C.

The milled carbon fibers were mixed with potassium hydroxide in an amount of 4 times the weight of the fibers. The resulting mixture was heated at 500° C. for 10 hours in a nitrogen gas to perform activation, and then washed in the same manner as in Example 1 to obtain milled mesophase pitch-based activated carbon fibers 10.

The activation yield, BET specific surface area and pore volume ratio (Bv/Av) of the milled activated carbon fibers 10 were measured, and are shown in Table 2 together with the production conditions.

As shown in Table 2, the activation yield of the milled mesophase pitch-based activated carbon fibers 10 was 88% by weight, and the fibers had a BET specific surface area of 1,520 m²/g and a ratio Bv/Av of 0.

Using the milled activated carbon fibers 10, an electrode sheet and an electric double layer capacitor were prepared in the same manner as in Example 1. A discharge capacity of the electric double layer capacitor was measured in the same manner as in Example 1. As a result, the discharge capacity was 21 F/g.

Comparative Example 3

Milled mesophase pitch-based carbon fibers having an average particle diameter of 25 μm were obtained in the same manner as in Example 1 except that the carbonization temperature was varied to 1,100° C.

The milled carbon fibers obtained were uniformly mixed with potassium hydroxide in an amount of 4 times the weight of the fibers. The resulting mixture was heated at 800° C. for 4 hours in a nitrogen gas to perform activation, and then washed in the same manner as in Example 1 to obtain milled mesophase pitch-based activated carbon fibers 11.

The activation yield, BET specific surface area and pore volume ratio (Bv/Av) of the milled activated carbon fibers 11 were measured and are shown in Table 2 together with the production conditions.

As shown in Table 2, the activation yield of the mesophase pitch-based activated carbon fibers 11 was 95% by weight, and the fibers had a BET specific surface area of 360 m²/g and a ratio Bv/Av of 0.

Using the milled activated carbon fibers 11, an electrode sheet and an electric double layer capacitor were prepared in the same manner as in Example 1. A discharge capacity of the electric double layer capacitor was measured in the same manner as in Example 1. As a result, the discharge capacity was 15 F/g.

TABLE 2

|  | Ex. 2 (1) MACF 7 | Ex. 3 MACF 8 | Comp. Ex. 2 MACF 9 | Ref. Ex. 1 MACF 10 | Comp. Ex. 3 MACF 11 |
| --- | --- | --- | --- | --- | --- |
| Temperature (° C.) | 950 | — | 700 | 600 | 1,100 |
| Milling (2) | After carbonization | after infusibilization | after activation | After ccarbonization | After carbonization |
| Amount of KOH (relative to CF) | 4 | 4 | 4 | 4 | 4 |
| Activation Temperature (° C.) | 800 | 700 | 700 | 500 | 800 |
| Activation Time (hr) | 4 | 2 | 2 | 10 | 4 |
| Activation Yield (wt %) | 90 | 70 | 88 | 88 | 95 |
| Specific Surface Area (m2/g) | 890 | 2,150 | 1,610 | 1,520 | 360 |
| Pore Volume Av (3) (ml/g) | 0.39 | 1.00 | 0.86 | 0.75 | 0.15 |
| Pore Volume Bv (4) (ml/g) | 0.012 | 0.161 | 0.00 | 0.00 | 0.00 |
| (Bv)/(Av) | 0.03 | 0.16 | 0 | 0 | 0 |
| Capacity of Capacitor (F/g) | 34 | 40 | 25 | 21 | 15 |

(note)
(1) MACF: Milled activated carbon fibers
(2) Milling: High-speed rotary mill
(3) Pore volume Av: A total pore volume of pores (A) of a radius of 0.4 to 1.5 nm and calculated by the MP method from the results of the BET measurement using nitrogen adsorption.
(4) Pore volume Bv: A total pore volume of pores (B) of a radius of 3.5 to 6 nm and measured with a mercury porosimeter.

What is claimed is:

1. Mesophase pitch-based activated carbon fibers which are obtained by milling infusibilized mesophase pitch fibers as they are or after carbonizing at a temperature of 350 to 1,000° C., to an average particle diameter of 5 to 50 μm and then activating in the presence of an alkali metal compound, wherein said mesophase pitch-based activated carbon fibers have a ratio Bv/Av of 0.01 to 0.25 in which Av is a total pore volume of pores having a radius of 0.4 to 1.5 nm, said pore volume being measured by a MP method using nitrogen adsorption, and Bv is a total pore volume of pores having a radius of 3.5 to 6 nm, said pore volume being measured by a mercury porosimeter.

2. The mesophase pitch-based activated carbon fibers as claimed in claim 1, which are made from mesophase pitch in which an optically anisotropic component is 100%.

3. An electric double layer capacitor which comprises an electrode comprising the mesophase pitch-based activated carbon fibers as claimed in any one of claims 1 or 2 and a binder.

* * * * *